Patented Apr. 11, 1933

1,903,599

UNITED STATES PATENT OFFICE

HUGO SCHWEITZER, OF LEVERKUSEN-WIESDORF, GERMANY, ASSIGNOR TO GENERAL ANILINE WORKS, INC., OF NEW YORK, N. Y., A CORPORATION OF DELAWARE

MONOAZODYESTUFFS

No Drawing. Application filed January 2, 1931, Serial No. 506,309, and in Germany January 4, 1930.

The present invention relates to new monoazodyestuffs, more particularly it relates to dyestuffs of the probable general formula:

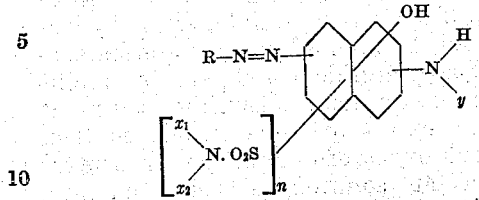

wherein R stands for the residue of an aromatic diazo-compound of the benzene or naphthalene series, $x_1$ and $x_2$ stand for hydrogen, alkyl, substituted alkyl, such as methyl, ethyl, hydroxyethyl, for hydrophenyl, phenyl or benzyl, $y$ stands for hydrogen, an acyl, alkyl or phenyl group, such as an acetyl or benzoyl group, and "$n$" stands for one of the numbers one and two, and wherein R and the naphthalene nucleus may be further substituted by the sulfonic acid group, an arylsulfone group, the carboxylic acid group, the sulfoneamide group, halogen, the nitro group, the alkyl group, the alkoxy group, the hydroxy group, a substituted amino group, the components being selected in such a manner that at least one of them contains a sulfonic acid group.

My new dyestuffs are prepared in the usual manner by coupling an aromatic diazo compound of the benzene or naphthalene series with an amino-hydroxy-naphthalene containing one or two unsubstituted or substituted sulfamino residues of a derivative or a substitution product thereof, the coupling being carried out either in an alkaline medium on the hydroxy side or in an acid medium on the amino side.

The dyestuffs thus obtained are generally red to dark powders, dyeing wool clear red to black shades fast to light, often of unusual fastness to washing and fulling and of unobjectionable evenness. The new dyestuffs are likewise very suitable for the manufacture of pigments and for printing. Individual representatives of the new class of dyestuffs are also suitable in dyeing cellulose acetate silk.

By employing diazo compounds, containing groups capable of forming metallic complexes, mordant dyeing azo dyestuffs are produced, which likewise possess very notable fastness properties.

The aminonaphtholsulfonic-acid-amides used as coupling components in my invention are prepared by treating the corresponding acyl-aminonaphtholsulfochlorides described in British Specification 326226 with ammonia or a suitable base, such as aniline, dimethylamine, benzylamine, ethylbenzylamine and the like, and saponifying the acyl-amino group in the usual manner.

The invention is illustrated by the following examples, without being limited thereto:

*Example 1.*—17.3 parts by weight of aniline-2-sulfonic-acid are diazotized in the customary manner. The diazo-compound is run into an alkaline sodium carbonate solution of 53.9 parts by weight of 1-acetylamino-8-hydroxynaphthalene-3.6-disulfodi-(N-methylanilide.) When the coupling is complete, the dyestuff of the following formula:

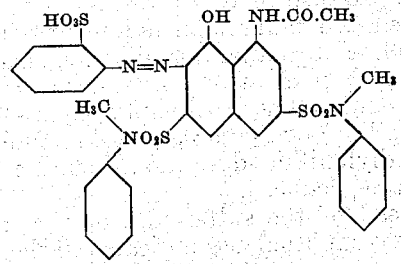

is salted out, filtered with suction and dried. It dyes wool a clear red shade, which withstands even severe fulling, is very fast to light, and it also possesses a pronounced capacity for even dyeing.

When the aniline-2-sulfonic acid is replaced by 4-amino-1-methylbenzene-3-sulfonic acid a clear bluish red is produced of the same fastness properties. Similar dyestuffs are obtained by the use of diazotized 4 - acetylamino - 1 - aminobenzene-2-sulfonic acid.

*Example 2.*—17.3 parts by weight of aniline-2-sulfonic acid are diazotized in the customary manner. The diazo solution is then run into an alkaline sodium carbonate solution of 46.9 parts by weight of 1-amino-8-hydroxynaphthalene- 3.6 - di(sulfanilide). When the coupling is complete, the dyestuff having the following formula:

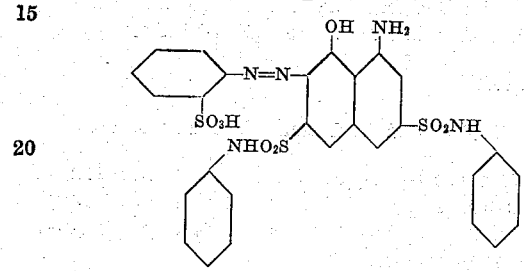

is salted out and worked up by the known methods. It dyes wool a wine red shade, fast to fulling and of satisfactory evenness.

*Example 3.*—18.9 parts by weight of 2-aminophenol-4-sulfonic acid are diazotized in the customary manner. The diazo compound is run into an alkaline solution of 46.9 parts by weight of 1-amino-8-hydroxynaphthalene-3.6-di(sulfanilide). When the coupling is complete the dyestuff of the following formula:

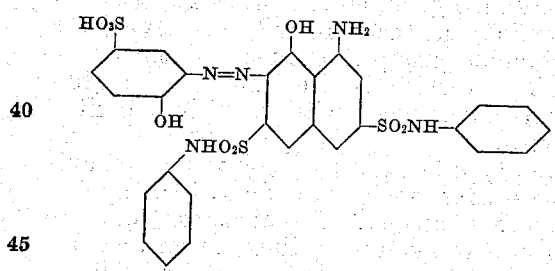

is salted out and worked up in the known manner. It dyes wool a reddish violet shade, which, on after-chroming, is converted into a fast greenish blue.

When the 2-aminophenol-4-sulfonic acid is replaced by other o-aminophenolsulfonic acids, such as chloro- or nitro-derivatives or the 1-amino-8-hydroxynaphthalene - 3.6 - di (sulfanilide) by the corresponding N-methyl- or N-ethylanilide, dyestuffs of similar properties are produced.

Instead of the sulfamides of the aminohydroxy-naphthalenes indicated in the above examples other sulfamides of other aminonaphthols, such as for example, 1-acetylamino-8-hydroxynaphthalene-4.6-disulfo-di-(N-methylanilide) can likewise be used.

*Example 4.*—21.8 parts by weight of 3-nitro-1-aniline-6-sulfonic acid are diazotized in the customary manner and coupled with 34.2 parts by weight of 2-amino-8-hydroxynaphthalene-6-sulfo-N-ethylanilide in alkaline sodium bicarbonate solution. The dyestuff of the following formula:

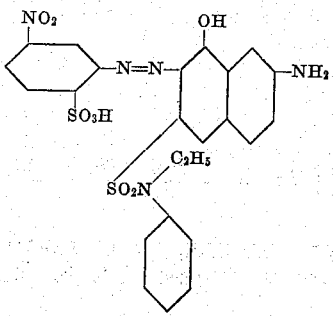

is worked up in the customary manner; it dyes wool brick red shades, fast to fulling and light and of satisfactory evenness.

*Example 5.*—17.3 parts by weight of aniline-2-sulfonic acid are diazotized in the customary manner. The diazo compound is run into a cold solution, (diluted with a little water) of 37.9 parts by weight of the hydrochloride of 2-amino-8-hydroxynaphthalene-6-sulfo-N-ethylanilide in 150 parts by weight of glacial acetic acid. Coupling begins at once. The excess of mineral acid is then neutralized by careful addition of neutral sodium acetate solution in such a manner, that a faint reaction due to mineral acid persists. When the coupling is complete the dyestuff of the following formula:

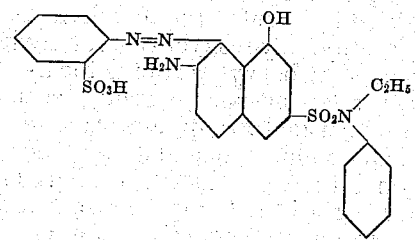

is salted out, converted into its sodium salt and dried. It dyes wool a clear red shade, fast to fulling and light and of very satisfactory evenness.

Dyestuffs of similar properties are obtained by replacing the aniline-2-sulfonic acid by other aromatic amino-sulfonic- or carboxylic-acids, for example, by chloro-aniline-sulfonic acids or by 4-acetylamino-1-aminobenzene-sulfonic acids; furthermore the substitution for the 2-amino-8-hydroxynaphthalene-6-sulfo-N-ethylanilide of other 2-amino-8-hydroxynaphthalene-6-sulfonic acid amide, as 2-methylamino-8-hydroxynaphthalene-6-sulfonic-N-methylanilide yields dyestuffs of the same fastness properties.

*Example 6.*—25.3 parts by weight of aniline-2.5-di-sulfonic acid are diazotized in the customary manner. The diazo compound is added to a solution, diluted with water, of 37.9 parts by weight of the hydrochloride or 2-amino-8-hydroxynaphthalene-6 - sulfo - N - methylanilide in 200 parts by weight of glacial acetic acid and the coupling and working up of the dyestuff is carried out as described in Example 5. The dyestuff having the following formula:

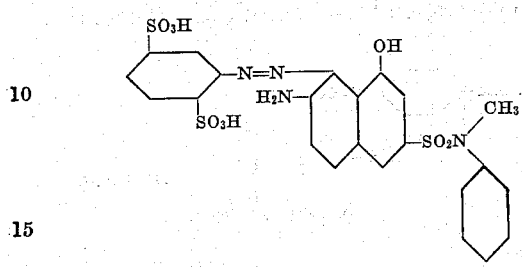

dyes wool a red shade of satisfactory fastness to fulling and light, combined with satisfactory evenness.

When the aniline-2.5-disulfonic acid is replaced by aniline-2.4-disulfonic acid a red is likewise produced; replacement by 3-nitraniline-4.6-disulfonic acid yields a ruby shade of similar satisfactory properties.

*Example 7.*—37.3 parts by weight of 2-amino - 4' - hydroxy - 3'- carboxydiphenylsulfone-4-sulfonic acid are dissolved in 400 parts of water by means of a little alkali. After the addition of 6.9 parts by weight of sodium nitrite the solution is run at about 20° C. with thorough stirring into an excess of dilute hydrochloric acid. The diazo compound, which separates, is filtered with suction, made into a paste with a little water and added to a solution, diluted with water, of 37.9 parts by weight of the hydrochloride of 2-amino-8-hydroxynaphthalene-6-sulfo-N-methylanilide in 100 parts by weight of glacial acetic acid. The working up of the dyestuff of the following formula:

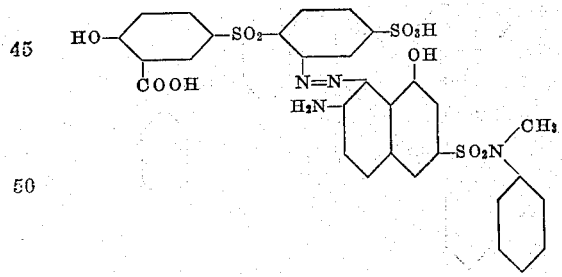

which is quickly formed, is carried out in the customary manner.

The dyestuff dyes wool a beautiful bluish red shade, which on after-chroming becomes somewhat bluer and very fast. When the 2 - amino - 4'-hydroxy-3'-carboxy-di-phenyl-sulfone-4-sulfonic acid is replaced by 2-amino-2'-hydroxy-3'-carboxy - 5' - methyldiphenylsulfone-4-sulfonic acid and the 2-amino-8-hydroxynaphthalene - 6-sulfo-N-methyl-anilide by the corresponding N-ethyl- or N-hydroxy-ethyl compound or by 2-phenylamino-8-hydroxynaphthalene-6-sulfonic anilide similar dyestuffs are produced. When the 2 - amino - 4' - hydroxy-3'-carboxy-diphenylsulfone-4-sulfonic acid is replaced by 4'-hydroxy-3'-carboxy-2-amino-5 - acetylaminodiphenylsulfone and the 2-amino-8-hydroxynaphthalene-6-sulfo-N-methylanilide by the 2-amino-8-hydroxynaphthalene-6-sulfo-(4'-hydroxy-3'-carboxy anilide) a bordeaux shade results, which on after-chroming becomes somewhat yellower and very fast.

The sulfones used as diazo components in this example are derived from the salicyclic sulfones described in British Specifications Nos. 245765 and 245865.

*Example 8.*—22.3 parts by weight of 4-chloro-2-amino-phenol-6-sulfonic acid are diazotized in the known manner with 6.9 parts by weight of sodium nitrite in the presence of excess hydrochloric acid. The diazo solution is run into an alkaline sodium carbonate solution of 31.4 parts by weight of 2-amino-5-hydroxynaphthalene-7-sulfanilide. When the coupling is complete, the dye-stuff of the following formula:

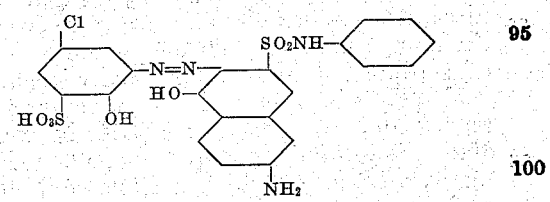

is salted out and worked up in the known manner. It dyes wool from an acid bath a brick red shade, which on after-chroming, is converted into a bluish black, very fast to fulling and of excellent fastness to light.

Similar dyestuffs are obtained by replacing the 4-chloro-2-aminophenol-6-sulfonic acid by other o-aminophenol- or o-aminonaphthol-sulfonic acids or by the corresponding carboxylic acids or by o-aminophenol-sulf-amides and similar compounds. When instead of the 2-amino-5-hydroxynaphthalene-7-sulfanilide the corresponding amide, methylamide, cyclohexylamide, benzylamide, methylanilide or piperidide or other amines are used similar fast dyestuffs are produced, which are distinguished from the dye-stuff of the example by possessing somewhat bluer or redder shades. On coupling molecular quantities of the diazo compound from 2-aminophenol-4-sulfamide and 2-amino-5-hydroxynaphthalene-7-sulfo-di-methylamide a monoazo dyestuff is obtained, the after-chromed dyeing of which on wool is likewise a very fast bluish black.

*Example 9.*—23.4 parts by weight of 6-nitro-2-aminophenol-4-sulfonic acid are diazotized in the customary manner with 6.9 parts by weight of sodium nitrite in the presence of an excess of hydrochloric acid and ice. The diazo solution is then run into a cold alkaline sodium carbonate solution of 31.4 parts by weight of 2-amino-8-hydroxynaphthalene-6-sulfanilide. When the coupling is complete, the dystuff having the following formula:

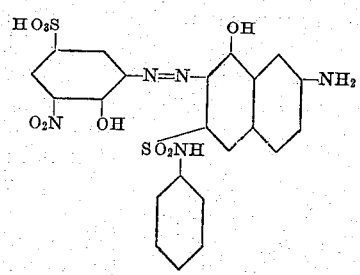

is salted out, pressed and dried. It dyes wool a navy blue, which on after-chroming is converted into a bluish black, very fast to fulling and of excellent fastness to light. By varying the diazo or coupling components as in Example 8, fast dyestuffs of similar shades are likewise obtained.

*Example 10.*—24.8 parts by weight of 2-nitraniline-4-sulfonic acid are diazotized in the known manner with 6.9 parts by weight of sodium nitrite and excess hydrochloric acid. The diazo compound is run slowly into an ice-cold solution of 32.8 parts by weight of 2-amino-8-hydroxynaphthalene-6-sulfo-N-methylanilide, to which a little sodium bicarbonate has been added and when the coupling is complete the dyestuff having the following formula:

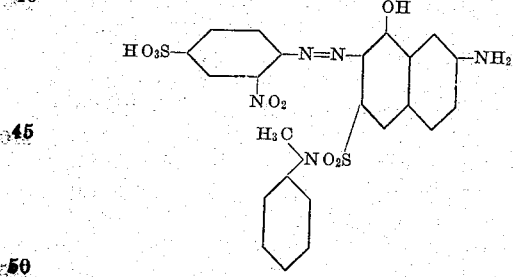

is worked up in the customary manner. It dyes wool from an acid bath a reddish brown shade, fast to fulling and light and of satisfactory evenness.

Similar brown dyestuffs are obtained by replacing the 2-nitraniline-4-sulfonic acid by 5-nitro-2-amino-1-methoxybenzene-4-sulfonic acid or by using, instead of the 2-amino-8-hydroxynaphthalene-6-sulfo-N-methylanilide, the corresponding N-ethylanilide, N-hydroxyethylanilide or dimethylamide or the like.

*Example 11.*—23 parts by weight of 1-amino-4-acetylaminobenzene-2-sulfonic acid are diazotized in the customary manner. The diazo compound is then run into a solution of 35.7 parts by weight of 2-amino-8-hydroxynaphthalene-6-sulfo-N-hydroxyethylanilide in dilute hydrochloric acid and the coupling and working up of the dyestuff which corresponds to the following formula:

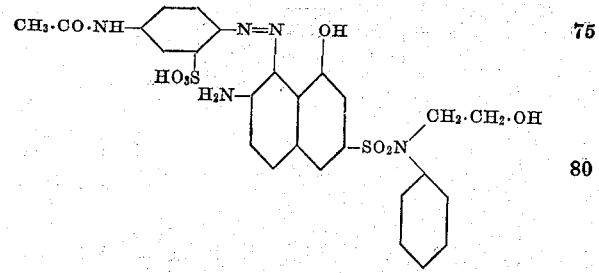

are carried out as indicated in Example 5.

The conversion of the dyestuff into a color lake or pigment is carried out by the known methods with or without the use of a substratum.

When employed as a coating as size color a clear bluish red, fast to water and of very satisfactory fastness to light is obtained. The barium lake of the dyestuff is insoluble in the organic solvents customarily used in conjunction with pigment dyestuffs.

*Example 12.*—18.7 parts by weight of 2-amino-1-methylbenzene-4-sulfonic acid are diazotized in the customary manner. The diazo compound is run into an alkaline sodium carbonate solution of 53.9 parts by weight of 1-acetylamino-8-hydroxynaphthalene-3.6-disulfo-di-(N-methylanilide). When the coupling is complete the dyestuff having the following formula:

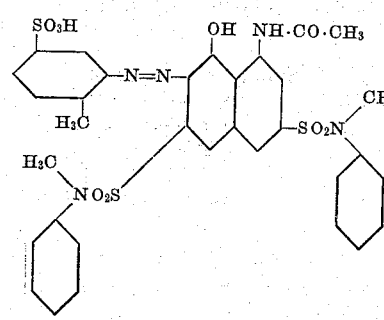

is salted out, filtered with suction and dried. From a neutral bath, for example, with the addition of sodium sulfate, it dyes acetate silk a pink shade, fast to washing.

*Example 13.*—18.7 parts by weight of 1-amino-4-methylbenzene-2-sulfonic acid are diazotized in the usual manner. The diazo compound is introduced in an alkaline sodium solution of 40 parts by weight of 2-acetylamino-8-naphthol-6-sulfo-N-(hydroxyethyl-anilide). When the coupling is complete the dyestuff having the following formula:

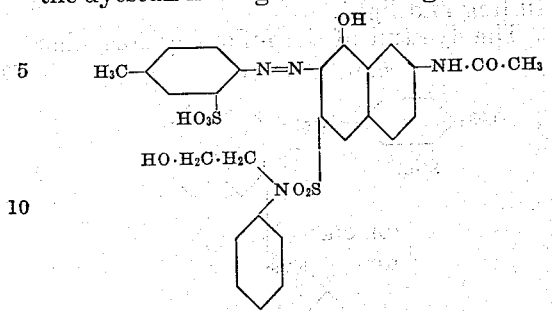

is salted out, filtered by suction, pressed and dried. It dyes wool from an acid bath a red shade, fast to fulling and light and of satisfactory evenness.

A similar dyestuff of somewhat yellower shade is obtained on replacing the 2-acetyl-amino-8-naphthol-6-sulfo-N-(hydroxyethyl-anilide by the 2-amino-5-naphthol-7-sulfo-N-hydroxyethylanilide.

On replacing the 1-amino-4-methylbenzene-2-sulfonic acid by the 1-naphthylamin-4-sulfonic acid a bluish red of similar properties is obtained.

I claim:

1. Monoazo dyestuffs of the probable general formula:

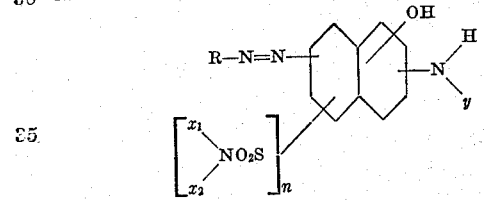

wherein R stands for the residue of an aromatic diazo-compound of the benzene or naphthalene series, $x_1$ and $x_2$ stand for hydrogen, alkyl, hydrophenyl, phenyl or benzyl, $y$ stands for hydrogen, an acyl, alkyl or phenyl group, "$n$" stands for one of the numbers one and two, the components of the dyestuffs being selected in such a manner that at least one of them contains a sulfonic acid group, and wherein the nuclei may be further substituted by substituents selected from the group consisting of the sulfonic acid group, an arylsulfone group, the carboxylic acid group, the sulfoneamide group, halogen, the nitro group, the alkyl group, the alkoxy group, the hydroxy group, a substituted amino group, being generally red to black powders, dyeing wool clear red to black shades fast to light.

2. Monoazo dyestuffs of the probable general formula:

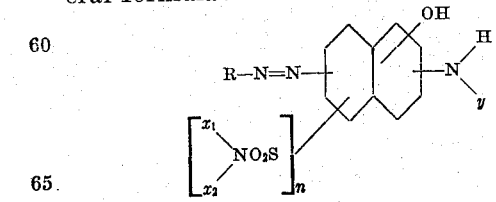

wherein R stands for the residue of an aromatic diazo-compound of the benzene or naphthalene series, $x_1$ stands for alkyl, $x_2$ stands for the benzene nucleus, $y$ stands for hydrogen, an acyl, alkyl or phenyl group, "$n$" stands for one of the numbers one and two, the components of the dyestuffs being selected in such a manner that at least one of them contains a sulfonic acid group and wherein the nuclei may be further substituted by substituents selected from the group consisting of the sulfonic acid group, an arylsulfone group, the carboxylic acid group, the sulfoneamide group, halogen, the nitro group, the alkyl group, the alkoxy group, the hydroxy group, a substituted amino group, being generally red to black powders, dyeing wool clear red to black shades fast to light.

3. Monoazo dyestuffs of the probable general formula:

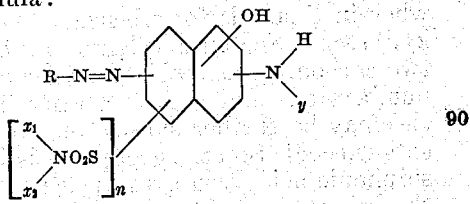

wherein R stands for the residue of an aromatic diazo compound of the benzene or naphthalene series, $x_1$ stands for alkyl, $x_2$ stands for the benzene nucleus, $y$ stands for hydrogen, an acyl, alkyl or phenyl group, $n$ stands for one of the numbers one and two, the azo bridge standing in ortho-position to the group NH.$y$, the components of the dyestuffs being selected in such a manner that at least one of them contains a sulfonic acid group, and wherein the nuclei may be further substituted by substituents selected from the group consisting of the sulfonic acid group, an arylsulfone group, the carboxylic acid group, the sulfoneamide group, halogen, the nitro group, the alkyl group, the alkoxy group, the hydroxy group, a substituted amino group, being generally red to black powders, dyeing wool clear red to black shades fast to light.

4. Monoazo dyestuffs of the probable general formula:

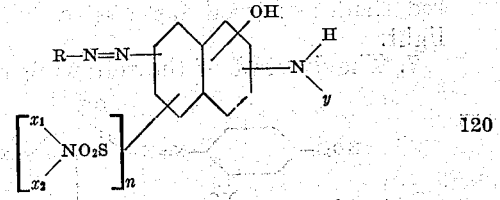

wherein R stands for the residue of an aromatic diazo compound of the benzene or naphthalene series, $x_1$ stands for alkyl, $x_2$ stands for the benzene nucleus, $y$ stands for hydrogen, an acyl, alkyl or phenyl group, "$n$" stands for one of the numbers one and two, the azo bridge standing in ortho-position to the hydroxy group of the naphthalene nucleus, the components of the dyestuffs being selected in such a manner that at least one of them contains a sulfonic acid group, and wherein the nuclei may be further substituted by substituents selected from the group consisting of the sulfonic acid group, an arylsulfone group, the carboxylic acid group, the sulfoneamide group, halogen, the nitro group, the alkyl group, the alkoxy group, the hydroxy group, a substituted amino group, being generally red to black powders, dyeing wool clear red to black shades fast to light.

5. Monoazo dyestuffs of the probable general formula:

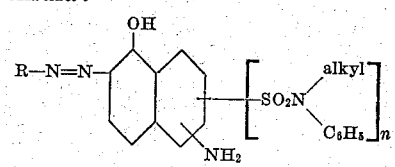

wherein R stands for a benzene nucleus, "alkyl" stands for an alkyl group from one to two carbon atoms, "n" stands for one of the numbers one and two, and wherein the nuclei may be further substituted by substituents selected from the group consisting of the sulphonic acid group, an arylsulfone group, the carboxylic acid group, the sulfonamide group, halogen, the nitro group, the alkyl group, the alkoxy group, the hydroxy group, a substituted amino group, the components being selected in such a manner that at least one of them contains a sulfonic acid group, being generally red to black powders, dyeing wool clear red to black shades fast to light.

6. The dyestuff of the following formula:

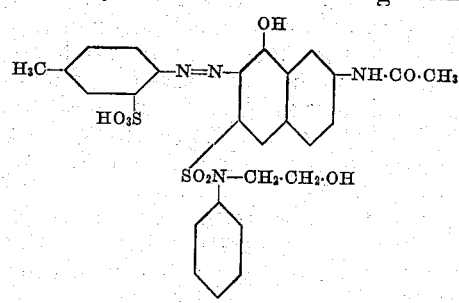

being in the form of its alkali metal salts a red powder dyeing wool from an acid bath red shades of good fastness to fulling and light.

7. The dyestuff of the following formula:

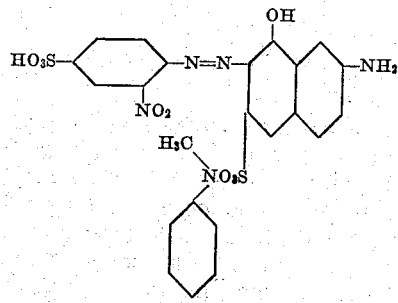

being in the form of its alkali metal salts a brown powder, dyeing wool from an acid bath reddish-brown shades of good fastness to fulling and light.

8. The dyestuff of the following formula:

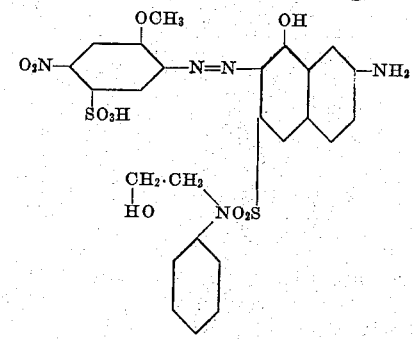

being in the form of its alkali metal salts a brown powder, dyeing wool from an acid bath reddish-brown shades of good fastness to fulling and light.

In testimony whereof, I affix my signature.

HUGO SCHWEITZER.